United States Patent [19]

Bieg

[11] Patent Number: 4,977,777
[45] Date of Patent: Dec. 18, 1990

[54] NON-CONTACT CONTOUR GAGE

[75] Inventor: Lothar F. Bieg, Louisville, Colo.

[73] Assignee: The United States of America as Represented by the United States Department of Energy, Washington, D.C.

[21] Appl. No.: 308,074

[22] Filed: Feb. 9, 1989

[51] Int. Cl.$^5$ .............................................. G01B 13/16
[52] U.S. Cl. ..................................... 73/37.5; 73/37.9
[58] Field of Search ..................... 73/37.5, 37.6, 37.7, 73/37.8, 37.9

[56] References Cited

U.S. PATENT DOCUMENTS

| 2,479,606 | 8/1949 | Douglass | 73/37.9 |
|---|---|---|---|
| 2,781,661 | 2/1957 | Van Dorn | 73/37.9 |
| 3,364,728 | 1/1968 | Albertson et al. | 73/37.5 |
| 3,884,076 | 5/1975 | Studer | 73/37.6 |
| 3,889,520 | 6/1975 | Stoferle et al. | 73/37.5 |
| 4,041,770 | 8/1977 | Staheli et al. | 73/37.5 |
| 4,098,408 | 7/1978 | Miller, Jr. et al. | 209/82 |
| 4,103,535 | 8/1978 | Mutter et al. | 73/37.5 |
| 4,206,633 | 6/1980 | McKechnie et al. | 73/105 |
| 4,325,248 | 4/1982 | Kolosov | 73/37.5 |
| 4,364,270 | 12/1982 | Heinzl et al. | |
| 4,604,892 | 8/1986 | Carreras | 73/37.5 |

FOREIGN PATENT DOCUMENTS

| 1141462 | 12/1962 | Fed. Rep. of Germany | 73/37.5 |
|---|---|---|---|
| 52-2453 | 1/1977 | Japan | 73/37.9 |
| 286242 | 1/1971 | U.S.S.R. | 73/37.5 |

Primary Examiner—Hezron E. Williams
Assistant Examiner—Joseph W. Roskos
Attorney, Agent, or Firm—Anne D. Daniel; James H. Chafin; William R. Moser

[57] ABSTRACT

A fluid probe for measuring the surface contour of a machined part is provided whereby the machined part can remain on the machining apparatus during surface contour measurement. A measuring nozzle in a measuring probe directs a measuring fluid flow onto the surface. The measuring nozzle is on the probe situated midway between two guide nozzles that direct guide fluid flows onto the surface. When the guide fluid flows interact with the surface, they cause the measuring flow and measuring probe to be oriented perpendicular to the surface. The measuring probe includes a pressure chamber whose pressure is monitored. As the measuring fluid flow encounters changes in surface contour, pressure changes occur in the pressure chamber. The surface contour is represented as data corresponding to pressure changes in the pressure chamber as the surface is scanned.

16 Claims, 4 Drawing Sheets

NON-CONTACT CONTOUR GAGE

The United States Government has rights in this invention pursuant to Contract No. DE-AC04-76DP03533 between the United States Department of Energy and Rockwell International Corporation

Cross-Reference to Co-Pending Application

The present invention is related to my co-pending application Ser. No. 308,336 filed Feb. 9, 1989 for Precision Contour Gage.

BACKGROUND OF THE INVENTION

The present invention relates to the field of contour gages, and more particularly to a gage that accurately and automatically measures internal and external dimensions of hemispherical parts, both convex and concave.

In the art of measuring the surface contours of machined parts, the prior art is very limited in its disclosure of on-machine gages that permit contour measurements of machined parts while they are still on the machining equipment. Industry generally separates the task of production and inspection, wherein they are performed by two different departments in two different environments.

Among the limited prior art gaging devices that are used to measure the surfaces of machined parts while still on the machine tool, some gaging devices employ touch probes that are used in place of the cutting tool. Such touch probes use the slides on the machine tool and are limited to a point-to-point contact probing mode of operation. Consequently, such touch probe gages cannot perform any scanning action on the machined contour It would be desirable, however, if a contour gage were available that did not use the slides of the machine tool and that performed a scanning action on the machined contour.

There are gages which are known which utilize two linear Cartesian motions (e.g. an X and Y) to gage circular surfaces with a probe. With such a Cartesian driven probe, the angle between the probe and the surface is constantly changing and is other than normal to the surface, except when the angle between the X and Y motions is 45 degrees. With the Cartesian driven probe, there may be heavy side loads exerted on the probe by the surface that is being gaged. Side loads being exerted on the probe can be the cause of erroneous data with respect to the gaged surface. It would be desirable to have a probe system which constantly maintains the probe normal to the surface being gaged thereby avoiding side loads being exerted on the probe.

Another problem associated with contour gages that employ Cartesian motions is that the gage probes directly contact the surface being measured. The direct contact is undesirable because of the frictional drag between the probe and the surface. The direct contact is also undesirable because there is the possibility that extraneous particles may be trapped between the probe and the surface bringing out an erroneous reading and causing damage to the probe. It would be desirable, therefore, to be able to measure the contour of a surface using a probe that does not directly contact the surface being measured.

In the prior art, fluid probes, also known as pneumatic probes, are known for measuring overall surface characteristics. For example, U.S. Pat. No. 4,325,248 of Kolosov discloses that the thickness of a storage cell plate is measured by an indirect measurement in which a pressure change in a pneumatic probe is used to dislocate a diaphragm, and the movement of the diaphragm disrupts a light path leading to a photo-electric transducer. The details of the contour of the surface of the plate are not scanned, and the thickness is obtained by integrating the entire surface of the plate. In view of the complexities in the measurement system of the Kolosov patent involving a photo-electric transducer, and in view of the lack of scanning of the surface of the plate, it would be desirable to have a fluid probe system that does not use a photo-electric transducer. It would also be desirable to have a fluid probe system in which the surface contour is scanned to provide detailed surface contour information rather than merely an integrated value for the entire surface.

SUMMARY OF THE INVENTION

Accordingly, it is a primary object of the present invention to provide a probe system which constantly maintains the probe normal to the surface being gaged thereby avoiding side loads being exerted on the probe.

Yet another object is to provide a fluid probe system that directly correlates pressure changes to surface contour variations.

Another object is to provide a fluid probe system in which the surface contour is scanned to provide detailed surface contour information rather than merely an integrated value for the entire surface.

Another object of the invention is to provide a contour gage that measures the contour of a surface using a probe that does not directly contact the surface being measured.

Yet another object of the invention is to provide a contour gage that removes extraneous particles that are encountered between the probe and the surface being measured.

Another object is to provide a contour gage that can be used to measure a part while it is still associated with the machine tool equipment that produced the part.

An additional object of the invention is to provide a precision contour gage that does not use the slides of a machine tool and that performs a scanning action on the machined contour.

Additional objects, advantages, and novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

In accordance with the principles of the invention, an improved apparatus is provided for measuring the contour of a surface. The improved apparatus includes: a probe assembly which includes a measuring probe and means, which interact with the surface being measured, for maintaining the measuring probe substantially perpendicular to the surface being measured; a pivot for supporting the probe assembly; and means for supporting the pivot, whereby the supporting means pivotally supports the probe assembly as the perpendicular maintaining means interacts with the surface being measured.

More specifically, the measuring probe includes a measuring nozzle for directing a measuring fluid stream toward the surface being measured. Also, the perpendicular maintaining means includes two guide nozzles for directing guide fluid streams toward the surface being measured, whereby the guide fluid streams, interacting with the surface being measured, maintain the measuring fluid stream perpendicular to the surface being measured. Preferably, the measuring nozzle is positioned substantially midway between the two guide nozzles, and each of the guide nozzles directs its respective fluid stream perpendicular to the surface being measured. The measuring nozzle is located adjacent to the pivot, and the interaction of the two guide streams with the surface being measured causes the measuring nozzle to rotate around the pivot, whereby the measuring fluid stream is maintained perpendicular to the surface being measured.

The use of a measuring fluid stream provides that the measuring nozzle is set back from the surface being measured; and, therefore, the measuring nozzle does not come into contact with the surface being measured. Furthermore, the flowing fluid stream serves to blow away any extraneous particles or other loose material that may appear on the surface being measured adjacent to the measuring nozzle.

In accordance with broad principles of the invention, an improved apparatus for measuring the contour of a surface is provided wherein a fluid probe responds to variations in surface contour by providing variations in fluid pressure of the fluid flowing from the probe, and means are provided for monitoring the variations in fluid pressure, whereby data is obtained representing the contour of the surface. As the distance between the surface and the fluid probe becomes smaller, the pressure in the fluid rises. Conversely, as the distance between the surface and the fluid probe becomes larger, the pressure in the fluid decreases. Such pressure variations, thereby, become representative of the surface contour. The variations in fluid pressure may be linear with respect to variations in the surface contour.

In accordance with another aspect of the invention a complete apparatus is provided for measuring the contour of a surface. The complete contour measuring apparatus includes a probe apparatus as described above, and in addition, includes means for scanning the surface, and means for monitoring at least one parameter (e.g. pressure) related to the measuring fluid stream as the surface is scanned, whereby data is obtained representing the scanned surface. A numerical controller is used to coordinate the probing, scanning, and monitoring operations.

With the complete contour measuring apparatus, a fluid source is provided to supply fluid (e.g. air) to the fluid probe. Preferably, the fluid source first supplies pressurized air to a pressure chamber. The pressure chamber has an inlet orifice which receives air from the fluid source and has an outlet orifice that supplies pressurized air to the fluid probe. The fluid probe includes a measuring nozzle for directing a measuring fluid stream to the surface being measured.

A pressure transducer is provided for monitoring the pressure in the pressure chamber. Data are obtained from the pressure transducer as the surface is scanned which represent the surface contour of the scanned surface.

Alternatively, means may be provided for monitoring the variations in flow of the measuring fluid stream as the surface is being measured.

In accordance with another aspect of the invention, a method is provided for measuring the contour of a surface. The method includes the steps of: directing a fluid stream, from a pressure chamber, toward the surface; scanning the surface with the fluid stream; and monitoring the pressure in the pressure chamber as the surface is scanned to obtain data representing the contour of the scanned surface. A numerical controller may be used to coordinate the probing, scanning and monitoring steps.

In accordance with yet another aspect of the invention, a method is provided for real-time control of a measuring apparatus that measures a surface contour. The real-time control method employs a numerical controller to coordinate the steps of: obtaining ideal contour data representing an ideal surface; initiating measuring of the surface to obtain actual contour data; comparing the actual contour data with ideal contour data in real-time and determining an actual disparity between the actual surface and the ideal surface in real-time; and halting measuring of the surface in real-time if the actual disparity is greater than a predetermined disparity between the actual surface and the ideal surface.

The complete apparatus for measuring the contour of a surface of a machined part also includes a rotary slide assembly for moving the fluid probe during scanning the surface to be measured. The rotary slide assembly is mounted in a kinematic mount which includes a fixed mounting portion and at least one movable mounting portion, whereby the contour gage apparatus is moved into and out of measuring position with respect to the machined part by sliding of the apparatus on the movable mounting portion and by rotation of the gage apparatus around said fixed mounting portion.

The fluid probe apparatus is mounted on a suspension arm which is supported by the rotary slide assembly. The suspension arm includes a slider portion which is capable of sliding upon a rail portion of the rotary slide assembly, whereby the fluid probe apparatus is capable of being positioned with respect to the surface being measured. Means is provided for recording data representing linear positions of the contour of the surface of the part being measured with respect to the measuring orifice of the fluid probe at prescribed intervals in the change in positions between the part and the fluid probe. The data recording means includes a digital encoder capable of digitizing the degree of rotation of the rotary slide assembly. Preferably, one increment of the digital encoder is calibrated to correspond to one arc second of rotation of the rotary slide assembly.

Still other objects of the present invention will become readily apparent to those skilled in this art from the following description, wherein there is shown and described a preferred embodiment of this invention. Simply by way of illustration, the invention will be set forth in part in the description that follows and in part will become apparent to those skilled in the art upon examination of the following or may be learned with the practice of the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION

Figure 1:
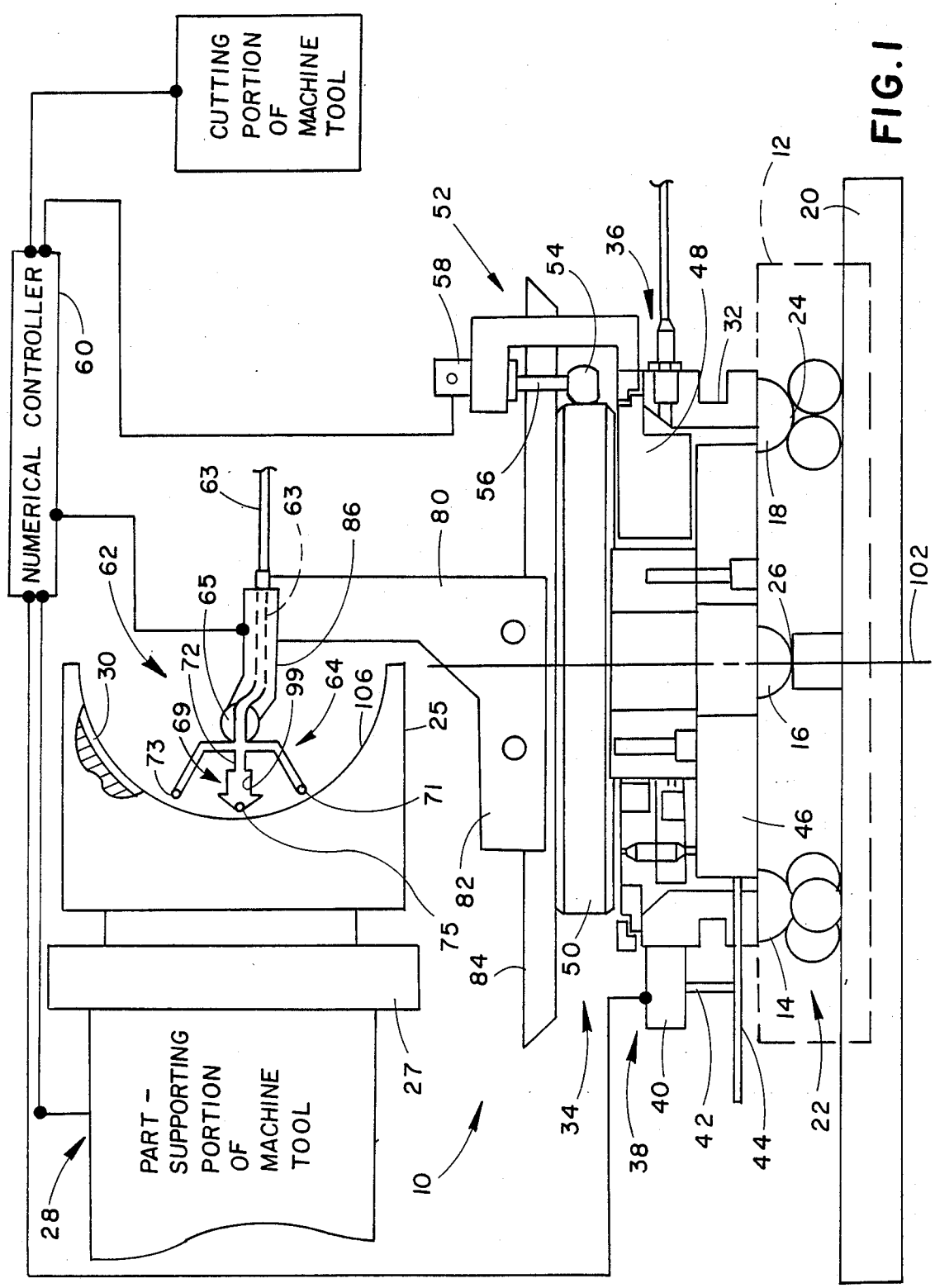
FIG. 1 is a side schematic view of an embodiment of a contour gage of the invention used for measuring a concave part in position on a machining apparatus.

As shown in FIG. 1, an on-machine contour gage apparatus 10 of the invention is mounted on a kinematic mount 12 which includes three legs for support. Each leg has a ball 14, 16, and 18 respectively on which the respective leg rolls whereby the on-machine contour gage apparatus of the invention is positioned on a slide 20. Ball 14 rests in a cone 22 which serves as an infinite fixed point (or radius point) around which the on-machine contour gage apparatus of the invention can be rotated for positioning. The second ball 18 rests in a groove 24 which allows the on-machine contour gage apparatus of the invention to expand if there would be thermal expansion in one direction along the central line of the groove 24. The third ball 16 rests on a flat surface 26 whereby the ball 16 can move in two directions. The kinematic mount 12 allows the on-machine contour gage apparatus of the invention to be positioned very accurately should it need to be removed from the slide and repositioned later. The kinematic mount 12 also permits the gage apparatus to be swung into or out of position with respect to the machining apparatus 28 which holds a part 30 whose contour is measured. The part 30 is mounted on vacuum pot chuck 25 on spindle 27 which forms part of the machining apparatus 28.

The on-machine contour gage apparatus of the invention includes a circular housing 32, a rotary slide assembly 34, and a hydrostatic bearing assembly 36 supported by the circular housing 32 and supporting the rotary slide assembly 34. A drive assembly 38 is supported by the circular housing 32 and includes a drive motor 40, a driven shaft 42, and a drive pulley 44 supported by the driven shaft 42. The drive pulley 44 is a metal disk which includes a hard rubber O-ring (not shown) around the circumference of the disk and frictionally engages and drives the lower portion 46 of the rotary slide assembly 34.

The hydrostatic bearing assembly 36 includes a circular ring 48 (supported by the housing 32) upon which the top portion of the rotary slide assembly is positioned. When air is pumped through a plurality of holes (not shown) in the top, bottom, and side surfaces of the circular ring 48, the air serves to lift up the top portion 50 of the rotary slide assembly 34 (perhaps only 20 millionth of an inch), permitting the entire rotary slide assembly 34 to be supported by a film of air (air bearing).

The surfaces of the on-machine contour gage apparatus of the invention are highly polished surfaces, and the hydrostatic bearing prevents small particles from scratching the surfaces during rotation of the contour gage.

An encoder assembly 52 is in contact with the top portion 50 of the rotary slide assembly 34 and produces digital signals that represent the rotational movement of the rotary slide assembly 34. More especially, the encoder assembly 52 includes a special barrel-shaped pulley 54 which rotates as the top portion 50 of the rotary slide assembly 34 rotates. The pulley 54 has an element which frictionally engages the perimeter of the top portion 50 of the rotary slide assembly 34. The pulley 54 is located on an encoding shaft 56, which, in turn, is connected to an encoding device 58 which converts the rotary motion of the pulley 54 into digital information.

The digital data representing the rotation of the rotary slide assembly 34 is sent to an electronic apparatus a numerical controller 60, which may be a General Electric Model No. 2000NC machine tool control. The numerical controller 60 has all of the numerical data necessary to guide the machining apparatus around its tooling path to machine a part 30. In addition, the electronic apparatus receives the digital data from the encoder assembly 52 once the part is machined.

More specifically, the numerical controller 60 performs the following functions. It takes digital data representing the angular position of the contour gage apparatus of the invention through the encoder assembly 52 and its electronics. It controls the drive motor 40, based on the data fed back from the encoder 58, to position the contour gage apparatus of the invention, and, therefore, to drive the gage in an angular or circular scanning motion. It collects data from a linear probe apparatus 62 which interfaces with the machined surface of the part 30 to provide data representing the scanned surface contour. It then compares the data representing a scanned surface contour with data representing an ideal shape of the machined part and computes any disparity between the actual and ideal sets of data.

Further in reference to FIG. 1, a suspension arm 80 is mounted on the upper portion 50 of the rotary assembly 34 and rotates therewith. The suspension arm 80 is preferably made of a material known as INVAR which has very low thermal expansion properties. More specifically, the suspension arm 80 is mounted on a conventional slide and rail assembly such as used in optical benches which is mounted on the upper portion 50 of the rotary assembly 34. The slide and rail assembly includes a slider portion 82 and a rail portion 84 mounted on the upper portion 50 of the rotary slide assembly 34. The slide and rail assembly is provided so that the contour gage apparatus of the invention can accommodate a wide range of parts. A six inch radius would permit measurement of the outer contour and the inner contour of a 12" part. The slide and rail assembly has a ruling device thereon so the user can know the approximate position of the suspension arm 80 with respect to the center of the part 30 being gaged.

In FIG. 1, a probe apparatus 62 for measuring the contour of a surface 106 includes a probe assembly 64, and a pivot 65 for supporting the probe assembly 64. An upper end 86 of the suspension arm 80 supports the pivot 65 whereby the suspension arm 80 pivotally supports the probe assembly 64. The probe assembly 64 includes a measuring probe 69 and two guide nozzles 71 and 73 for directing guide fluid streams (e.g. air) toward the surface 106 being measured. The measuring probe 69 includes a measuring nozzle 75 which is positioned substantially midway between the two guide nozzles 71, 73 and also includes a pressure chamber 99 and a tubular portion 72 located adjacent to the pivot 65. Each of the nozzles 71,73 directs its respective fluid stream perpendicular to the surface 106 being measured, whereby the guide fluid streams, interacting with the surface 106 being measured, cause the measuring nozzle 75 to pivot around the pivot 65, thereby maintaining the measuring fluid stream and the measuring probe 69 perpendicular to the surface 106 being measured.

The pivot 65 in FIG. 1 is a ball joint. For measuring the contours of spherical or cylindrical parts, a swivel may be used for the pivot 65.

Figure 2:
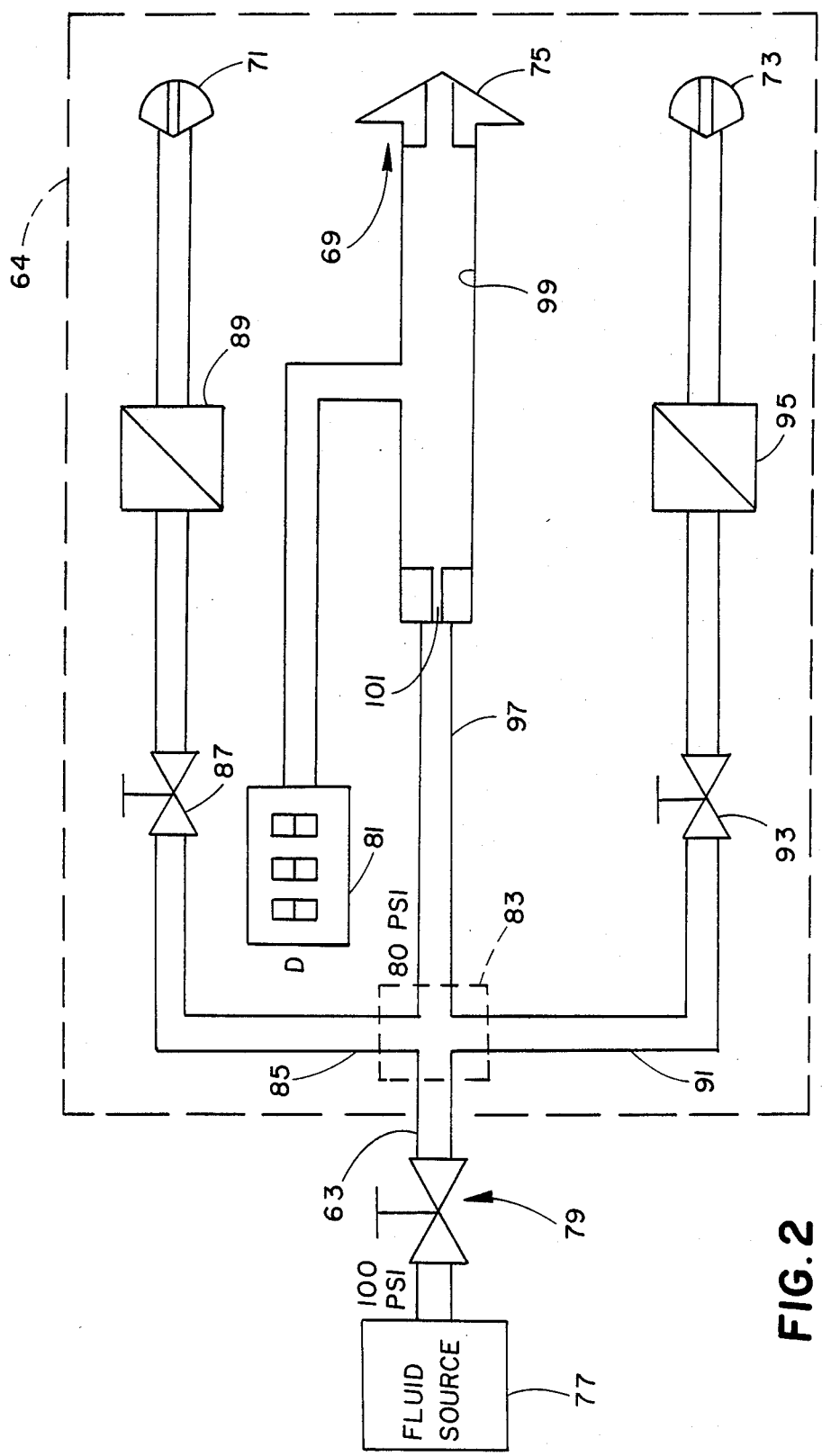
FIG. 2 is a schematic diagram of an embodiment of a probe apparatus of the invention.

Referring to FIG. 2, the measuring probe 69 is a fluid probe, and a fluid source 77 provides fluid pressure (100 p.s.i.) to the probe assembly 64 through valve 79. The measuring probe 69 responds to variations in surface contour by providing variations in fluid pressure to pressure transducer 81 which monitors the variations in fluid pressure. Signals representing pressure measurements are sent from transducer 81 to the numerical controller 60 (in FIG. 1). As pressure data is obtained, simultaneously, data is recorded that represents the rotation of the measuring probe 69. As the surface 106 is scanned, the contour of the surface 106 is represented by the points corresponding to the coordinates of pressure versus degree of rotation of the rotary slide assembly 34 through the encoder assembly 52 to the numerical controller 60 (FIG. 1).

The fluid source 77 supplies air at 100 p.s.i. through valve 79 to a manifold 83 which has three branches. The first branch 85 channels air through valve 87, by sensor 89, and out guide nozzle 71 to the surface 106. The second branch 91 channels air through valve 93, by sensor 95, and out guide nozzle 73 and to the surface 106. The third branch 97 channels air through entry orifice 101 to pressure chamber 99 and out measuring nozzle 75 to the surface 106 to be measured. The signals from sensors 89 and 95, respectively, may be used in a feedback loop to control valves 87 and 93, respectively, to regulate the fluid flow from guide nozzles 71 and 73, respectively.

As surface contour data is obtained, the data may be used in real-time to halt the measuring process if the surface being measured is excessively out of specifications. More specifically, ideal contour data is obtained representing an ideal surface. Measurement of the surface is initiated to obtain actual contour data. Then the actual contour data is compared with ideal contour data in real-time, and an actual disparity between the actual surface and the ideal surface is determined in real-time. Measurement of the surface in real-time is halted if the actual disparity is greater than a predetermined disparity between the actual surface and the ideal surface.

More specifically with respect to the process of measuring surface contours using a measuring nozzle 75 and a fluid stream exiting therefrom, the supply of pressurized air that enters into a chamber 99 is controlled by a restrictive orifice 101. The pressure and flow characteristics within this chamber 99 are monitored to provide data representing the dimensional relationship between the measuring orifice 75 and the surface 106 of a workpiece. A change in pressure within the chamber 99 occurs as soon as the measuring orifice 75 is moved towards or away from the part's surface. This change in pressure is measured in small parts of a pound per square inch (psi) by transducer 81. Depending on the size relationship between the restrictive orifice 101 and the measuring orifice 75, a linear range can be recorded where the pressure 'p' equals the distance 'd' between the measuring orifice 75 and the part surface 106.

In another respect, within certain limits, the pressure 'p' is inversely proportional to the area of the measuring orifice 75. The sensitivity of the measuring system can be increased by decreasing the diameter of the restrictive orifice 101.

In use, a machined part is placed a defined stand-off distance away from the measuring orifice 75. The defined distance correlates with a particular pressure and will be zero (0) in terms of displacement and, therefore, the zero reference point for the distance measurement.

Assuming a size relationship of 1 : 2 between the restrictive orifice 101 and the measuring nozzle 75 a linear measuring range of 0.15 mm, or 0.006 inches, at a measuring uncertainty of 0.0002 mm, or 0.000008 inches, has been achieved Once the measuring orifice 75 is too close to the part surface 106, the pressure in the chamber 99 reaches a maximum. Should the measuring orifice 75 be too far away from the part, a minimum pressure is recorded, which remains constant even if the distance between orifice 75 and the surface 106 continues to increase.

The volume of the measuring media can be calculated as:

$$M = 0.7854 * d^2 * h \text{ or}$$

$$M = 0.262 * h * (D^2 + d^2 + D*d)$$

where
  $'d' =$ the diameter of the measuring orifice,
  $'D' =$ the spot size at the part's surface,
and
  $'h' =$ the distance from orifice to surface.

All accuracy and geometry requirements specified in millimeters shall also apply in inches.

The gage and its control system operate efficiently in an ambient temperature range of 65–75 degrees Fahrenheit, and a relative humidity of up to 80%.

The operating attitude is horizontal, and the rotational arc of motion preferably should not be less than 120 degrees.

The system, being controlled by the numerical controller 60, is capable of operating from data supplied by magnetic media and from manually operated push buttons.

The ability to use this gage for different part sizes of the same part family and to measure inner and outer contours consecutively improves flexibility and the total acceptable parts output.

With the availability of a digital numerical controller system incorporating a machine tool and gage of the invention, statistical analysis can be utilized and the findings will enhance Computer Aided Manufacturing.

Interfacing this gage with the machine tool controller permits control and correction of each part machined, as well as evaluation of recurring trends over a number of parts.

Pressure and displacement data has been obtained for a variety of restrictive orifice 101 and measuring orifice 75 combinations.

Figure 3:
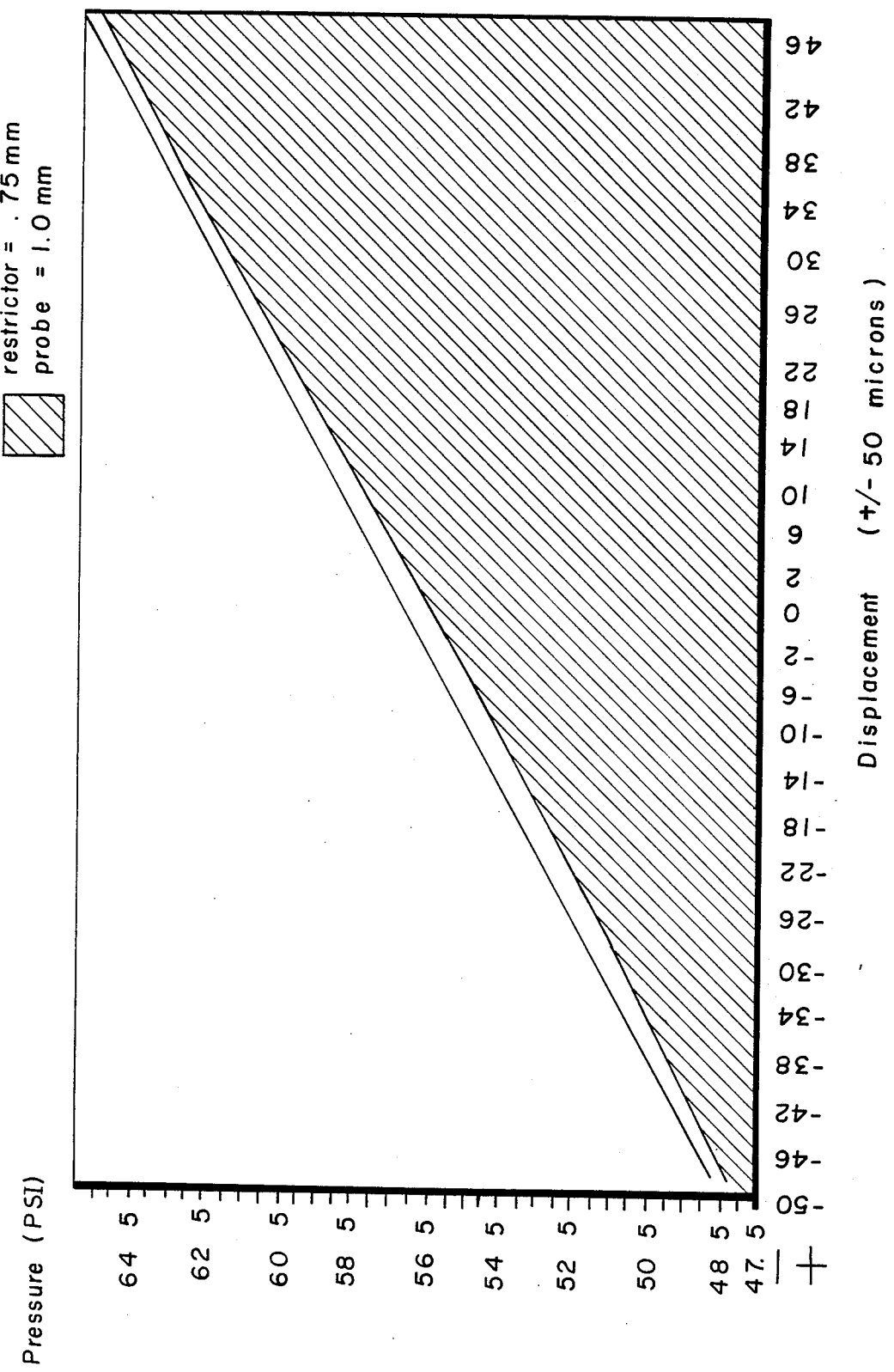
FIG. 3 is a graph depicting the relationship between pressure in the pressure chamber and displacement of the measuring nozzle from the surface being measured for one embodiment of the invention.

The combinations used for FIG. 3 consisted of a restrictor orifice 101 with a 0.75 mm orifice and a measuring orifice of 1.0 mm in diameter. The pressure ranged from 48 to 65.5 psi and the range of motion for linear response was 0.12 mm (120 microns) An average change in pressure of 0.12 psi per micron displacement was calculated. A total of one hundred data points were plotted to illustrate the linear behavior between displacement and pressure.

Figure 4:
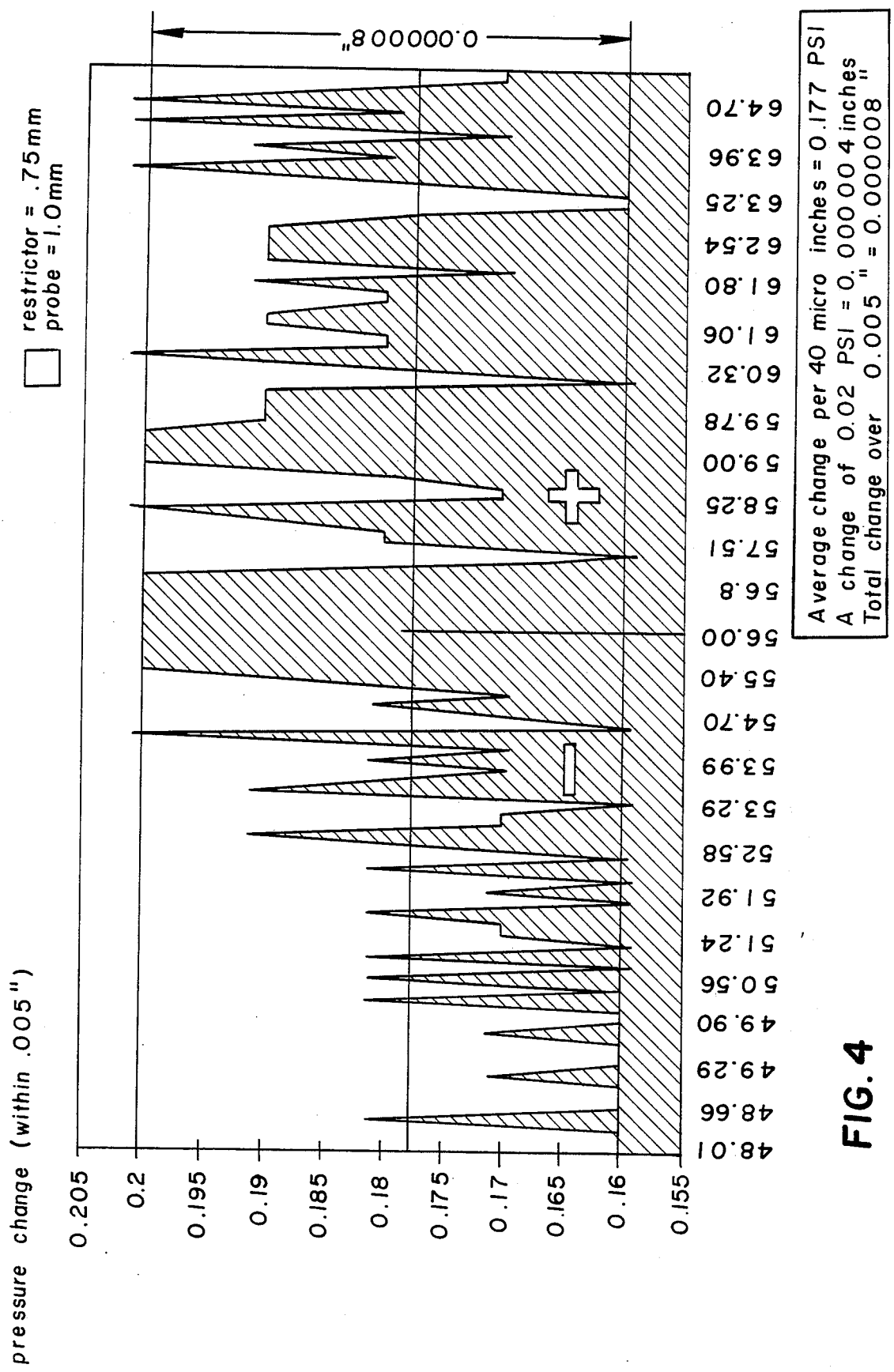
FIG. 4 is a graph depicting the fluctuation in pressure for data points taken for a pressure range spanning from 48 to 65 (PSI) using 56 PSI as a reference point.

FIG. 4 shows the same combination of restrictor orifice 101 and measuring nozzle or orifice 75 as used for FIG. 3, with the difference of illustrating the fluctuation in pressure within each data point taken. The range of pressure is set into correlation with the change in pressure over the distance of 0.12 mm or 120 microns. A total change of only 0.04 psi was measured within the 120 data points taken over the linear range of measurement. This condition calculates to an absolute uncertainty of 0.0002 mm or eight millionth of one inch. The response seen during this evaluation was fast.

Another evaluation (not illustrated) used a restrictor orifice of 0.75 mm and a measuring orifice of 1.5 mm. The range of pressure was 46 to 69 psi over a displacement of 0.14 mm or 0.0055 inches. The average change per 0.00004 inches was 0.23 psi and the difference between the minimum and maximum change in pressure over the entire range was 0.1 psi.

The maximum deviation between all 140 data points in this evaluation was 0.1 psi, providing a total uncertainty of 0.00044 mm or 0.000016 inches.

Another evaluation (not illustrated) employed both a restrictor orifice and a measuring orifice equaling a diameter of 0.5 mm. This combination allowed a linear measuring range of 0.072 mm or 0.003 inches at a pressure range of 56 to 70 psi. The average change per displacement unit was 0.19 psi, and the MIN/MAX difference was calculated to be 0.09 psi. It has been noted, that the travel range and the pressure range was smaller within this combination in comparison to the two previous case studies.

In this case the biggest change within the 72 readings in this study was 0.00047 mm or 0.00002 inches. Therefore the uncertainty over the entire measuring range was found to be very good.

In summary, numerous benefits have been described which result from employing the principles of the invention. With the invention, no physical contact between the measured surface and the contour gage takes place. A pneumatic guiding device is employed to maintain the fluid stream perpendicular to the surface that is scanned. As a result, there is no need to make a special correction for a probe tip, and the area to be measured is always parallel to the measuring orifice of the probe tip.

Since a flow of air is used to scan the surface being measured, the scanning path is continuously cleaned as the surface is scanned. Contaminants such as coolant, metal chips, oil, etc. are blown away from the surface being measured by the scanning air stream.

Since the probe tip does not directly contact the surface being measured, there is virtually no wear between the surface and the probe tip. This feature adds longevity to the apparatus and assures continuous optimum gage performance.

In an embodiment of the apparatus which is controlled by a numerical controller, independent judgment of a human operator is significantly reduced, thereby reducing the likelihood of human error.

By employing the present invention, a precision gage is provided for measurements of the contours of interior surfaces as well as the contours of exterior surfaces, especially of hemispherical parts. With the invention, a contour gage is provided that can be used to measure a part while it is still associated with the equipment that produced the part.

With the invention, a precision contour gage is provided that does not use the slides of a machine tool and that performs a scanning action on the machined contour.

The invention provides a probe system which constantly maintains the probe normal to the surface being gauged thereby avoiding side loads being exerted on the probe.

The invention provides a fluid probe system that directly correlates pressure changes to surface contour variations.

With the invention, a fluid probe system is provided in which the surface contour is scanned to provide detailed surface contour information rather than merely an integrated value for the entire surface.

The foregoing description of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A probe apparatus for measuring the contour of a surface, comprising:
   a probe assembly, comprising
      (1) a measuring probe comprising measuring nozzle means for directing a measuring fluid stream toward the surface being measured, and
      (2) means for maintaining said measuring probe substantially perpendicular to the surface being measured, said perpendicular maintaining means comprising guide nozzle means for directing guide fluid streams toward the surface being measured, whereby said guide fluid streams, interacting with the surface being measured, maintain said measuring fluid stream perpendicular to the surface being measured;
   pivot means for supporting said probe assembly;
   means for supporting said pivot means, whereby said supporting means pivotally supports said probe assembly as said perpendicular maintaining means interacts with the surface being measured.

2. The apparatus described in claim 1 wherein said measuring nozzle means is positioned substantially midway between two guide nozzles, each of said nozzles directing its respective fluid stream perpendicular to the surface being measured.

3. The apparatus described in claim 1 wherein said measuring probe is located adjacent to said pivot means, and the interaction between the surface and the guide streams from said two guide nozzle means causes said measuring probe to pivot around said pivot means, whereby the measuring fluid stream is maintained perpendicular to the surface being measured 4. A probe apparatus for measuring the contour of a surface, comprising:
   a probe assembly,
   pivot means for supporting said probe assembly,
   means for supporting said pivot means, whereby said supporting means pivotally supports said probe assembly said probe assembly including a measuring probe and means for maintaining said measuring probe substantially perpendicular to the surface being measured, said measuring probe including measuring nozzle means for directing a measuring fluid stream toward the surface being measured, said perpendicular maintaining means including two guide nozzles for directing guide fluid streams toward the surface being measured, said measuring nozzle means being positioned substantially midway between said two guide nozzles, said measuring probe being located adjacent to said pivot means, each of said nozzles directing its respective fluid stream perpendicular to the surface being measured, whereby the guide fluid streams, interacting with the surface being measured, cause said measuring probe to pivot around said pivot means, thereby maintaining the measuring fluid stream and said measuring probe perpendicular to the surface being measured.

5. An apparatus for maintaining a fluid probe perpendicular to a surface whose contour is measured, comprising:
   a measuring probe including measuring nozzle means for directing a measuring fluid stream toward the surface being measured,
   two guide nozzles for directing guide fluid streams toward the surface being measured,
   means for supporting said measuring probe and said guide nozzles,
   pivot means for supporting said support means whereby said measuring probe and said two guide nozzles are pivotally supported,
   said measuring nozzle means being positioned substantially midway between said two guide nozzles, said measuring probe being located adjacent to said pivot means, each of said nozzles directing its respective fluid stream perpendicular to the surface being measured, whereby the guide fluid streams, interacting with the surface being measured, cause said support means to pivot around said pivot means, thereby maintaining the measuring fluid stream and said measuring probe perpendicular to the surface being measured.

6. A method for measuring the contour of a surface, the method comprising the steps of:
   directing a fluid stream, from a pressure chamber, toward the surface,
   maintaining said fluid stream substantially perpendicular to the surface being measured,
   scanning the surface with said perpendicular fluid stream,
   monitoring at least one parameter related to said fluid stream as the surface is scanned to obtain data representing the scanned surface.

7. The method described in claim 6 wherein the pressure in a chamber from which the fluid stream emerges is monitored.

8. The method described in claim 6 wherein the flow rate of the fluid stream is monitored.

9. A method for real-time control of a contour measuring apparatus that measures a surface contour, the method comprising the steps of:
   initiating measuring of the surface to obtain actual contour data from monitoring measurements made by a means for measuring, whereby said measuring means is guided over the surface to be measured by at least two means for sliding in response to a predetermined parts program,
   obtaining ideal contour data representing an ideal surface from monitoring the movement of said slide means in response to said predetermined parts program,
   comparing said actual contour data with ideal contour data in real-time and determining an actual disparity between the actual surface and the ideal surface in real-time,
   halting measuring of the surface in real-time if the actual disparity is greater than a predetermined disparity between the actual surface and the ideal surface.

10. In an apparatus for measuring the contour of a surface, the apparatus including a fluid probe and a fluid source for the probe, the improvement comprising:
    a chamber,
    a first orifice for measuring,
    a second orifice for permitting fluid flow into said chamber and for restricting fluid pressure inside said chamber to less than the pressure of said fluid source, whereby said fluid probe is not responsive to pressure variations of said fluid source, and
    means for monitoring variations in fluid pressure,
    whereby said chamber and said first and second orifices combine to provide said fluid probe with respect to the surface being measured a predetermined standoff distance, a linear working range, and an out-of-range condition effective when said surface contour is too distant to be detected by said probe,
    whereby said fluid probe responds to variations in surface contour by providing variations in fluid pressure, which are monitored within said chamber,
    and whereby data representing the contour of the surface is obtained by said monitoring means.

11. The apparatus described in claim 10 wherein the variations in fluid pressure are linear with respect to variations in the surface contour.

12. The apparatus described in claim 10, further comprising a third orifice and a fourth orifice for guiding said fluid probe along a non-uniform surface contour.

13. An apparatus for measuring the contour of a surface, comprising:
    means for providing a measuring fluid stream exiting the apparatus, said means including a fluid source and a pressure chamber for receiving pressurized fluid from said fluid source;
    a probe apparatus comprising
      (1) a probe assembly, comprising
        (a) a measuring probe comprising measuring nozzle means for directing said measuring fluid stream toward the surface being measured, and
        (b) means for maintaining said measuring probe substantially perpendicular to the surface being measured, said perpendicular maintaining means comprising guide nozzle means for directing guide fluid streams toward the surface being measured, whereby said guide fluid streams, interacting with the surface being measured, maintain said measuring fluid stream perpendicular to the surface being measured,
      (2) pivot means for supporting said probe assembly, (3) means for supporting said pivot means, whereby said supporting means pivotally supports said probe assembly as said perpendicular maintaining means interacts with the surface being measured;

means for scanning the surface with said measuring fluid stream; and means for monitoring at least one parameter related to said measuring fluid stream as the surface is scanned, whereby data is obtained representing the scanned surface.

14. The apparatus described in claim 13 wherein said means for providing a measuring fluid stream includes a fluid source and a pressure chamber for receiving pressurized fluid.

15. The apparatus described in claim 13 wherein said monitoring means includes means for monitoring pressure in a chamber supplying the measuring fluid stream.

16. The apparatus described in claim 13 wherein said monitoring means includes means for monitoring flow of the measuring fluid stream.

* * * * *